United States Patent [19]
Ernst

[11] 3,857,455
[45] Dec. 31, 1974

[54] ROW CENTERING GUIDE CONTROL DEVICE FOR BUSH BEAN HARVESTER

[76] Inventor: James E. Ernst, Star Rt., Box 58 A, St. Paul, Oreg. 97137

[22] Filed: May 21, 1973

[21] Appl. No.: 361,889

[52] U.S. Cl. .............................. 180/79.2 R, 56/10.2
[51] Int. Cl. ............................................. B62d 5/06
[58] Field of Search............... 180/79.2 R, 79.1, 79; 56/10.2; 172/5, 6; 104/244.1

[56] References Cited
UNITED STATES PATENTS

| | | | |
|---|---|---|---|
| 2,509,914 | 5/1950 | Goodwine | 56/10.2 |
| 2,981,355 | 4/1961 | Rabuse | 180/79.1 |
| 3,038,544 | 6/1962 | Richey et al. | 180/79.1 X |
| 3,160,223 | 12/1964 | Kumferman | 180/79.2 R |
| 3,538,694 | 11/1970 | Holloway | 56/330 |

*Primary Examiner*—Kenneth H. Betts
*Assistant Examiner*—John A. Pekar
*Attorney, Agent, or Firm*—James D. Givnan, Jr.

[57] ABSTRACT

A steering control system for self-propelled agricultural machines such as bush bean harvesters and the like. The system includes four switches, preferably though not restrictively of the Micro type, series connected in electric circuitry. Two of the switches are pressure responsive and thereby operable by either right or left deviation, to a limited extent, in the course of travel of the machine. Closure of the electric circuit through these two steering control switches will activate solenoid-controlled steering mechanism to correct the course of travel of the steering wheels. Instantaneously upon such correction, the control of the solenoids and hence stabilization control of the steering wheels is transferred to the other two switches, also of the Micro type, for maintaining the steering wheels in alignment with the rear traction wheels of the machine in a straight and centered course of travel between and parallel to the rows of plants being dealt with.

3 Claims, 4 Drawing Figures

PATENTED DEC 31 1974 3,857,455

ROW CENTERING GUIDE CONTROL DEVICE FOR BUSH BEAN HARVESTER

This invention relates to improvements in agricultural harvesting machines and particularly, though not restrictively, to bush bean harvesting machines.

The principal objects of the invention are

To provide a relatively simple and effective electromechanical assembly for controlling the steerable front wheels of an agricultural machine to guide and stabilize the same in parallel and centered traveling relationship to at least two row crops, and which assembly is sufficiently sensitive to maintain the harvesting components of the machine in effectively close harvesting relationship to the sides and top of the plants in the rows being dealt with.

To provide switch actuating means in the form of a frame of generally horizontal disposition which may be pivotally mounted, for lateral movement, at or near the forward end of the machine, or at or near the rearward end thereof depending upon the nature, sturdiness and disposition of the crops to be harvested.

To provide automatic steering control mechanism to maintain the front and rear wheels of the machine in substantially equidistant relationship to adjacent crop rows to thereby permit the harvesting components of the machine to travel in side and top proximity to the plants being dealt with without danger of the harvesting components multilating the plants because of erratic or off course movement of the front wheels of the machine and hence the machine itself.

To provide control mechanism as defined having improved means permitting manual disconnection of the steering and alignment control mechanism from the manual steering components of the machine in a normal manner.

Although the agricultural machine and attachments as herein shown and described are characterized as bean-harvesting apparatus such disclosure is not intended to prescribe any limits to such utility since it will be apparent that the inventive concept can be just as expeditiously incorporated in or provided as attachments to tractors or other similar machines for harvesting row crops of various kinds.

The foregoing and other objects and advantages which will become subsequently apparent, reside in the details of construction and operation as more fully hereinafter described and claimed, reference being had to the accompanying drawing forming a part hereof and in which:

Figure 2:
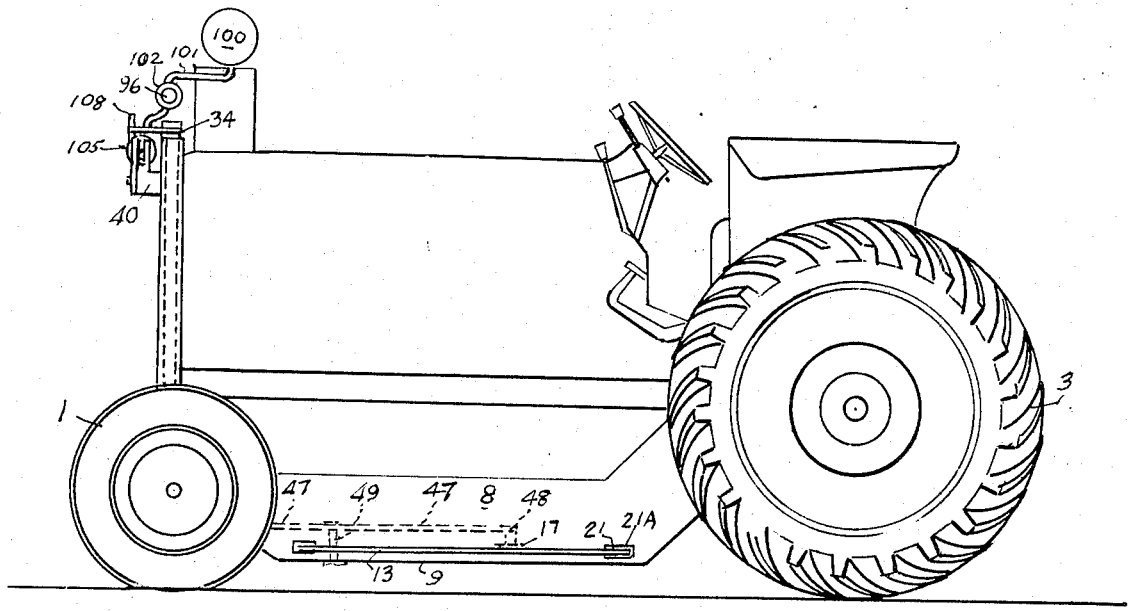
FIG. 2 is a somewhat diagrammatic top plan view of FIG. 1 with the super structure of the machine removed and some parts broken away to illustrate underlying parts.
Figure 1:
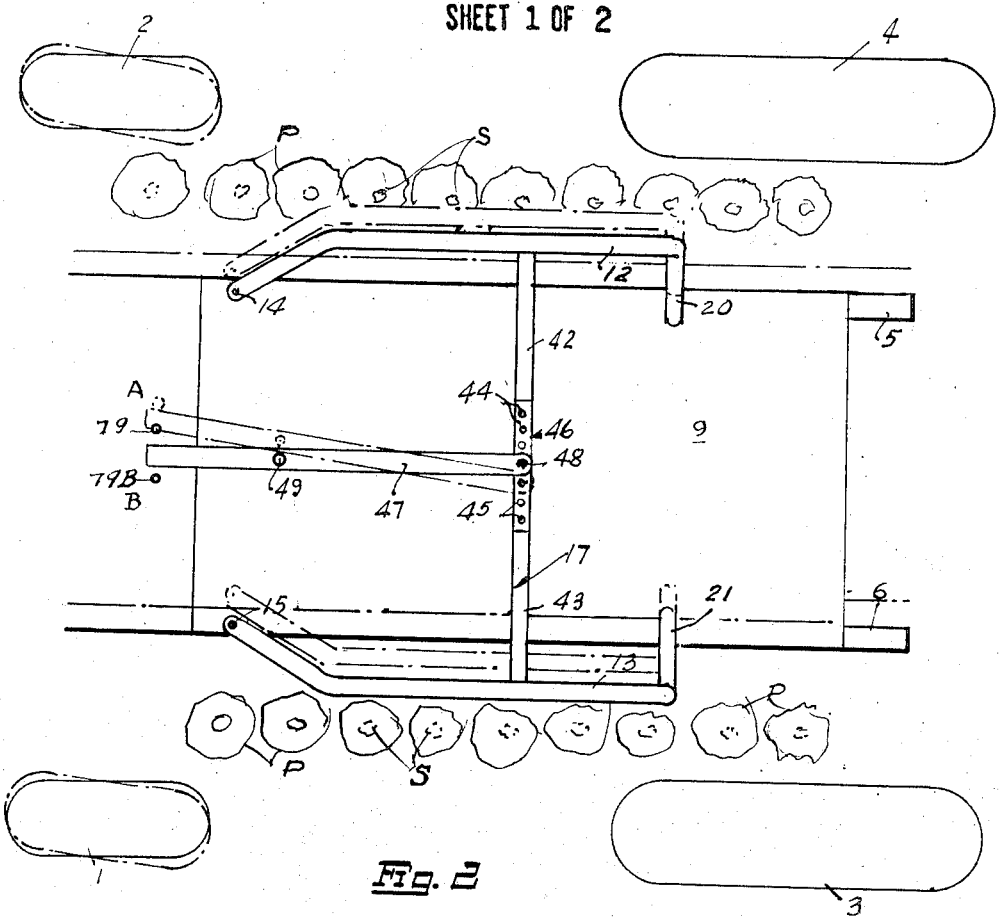
FIG. 1 is a side elevational view of an agricultural machine showing my invention operatably incorporated therein.
Figure 3:
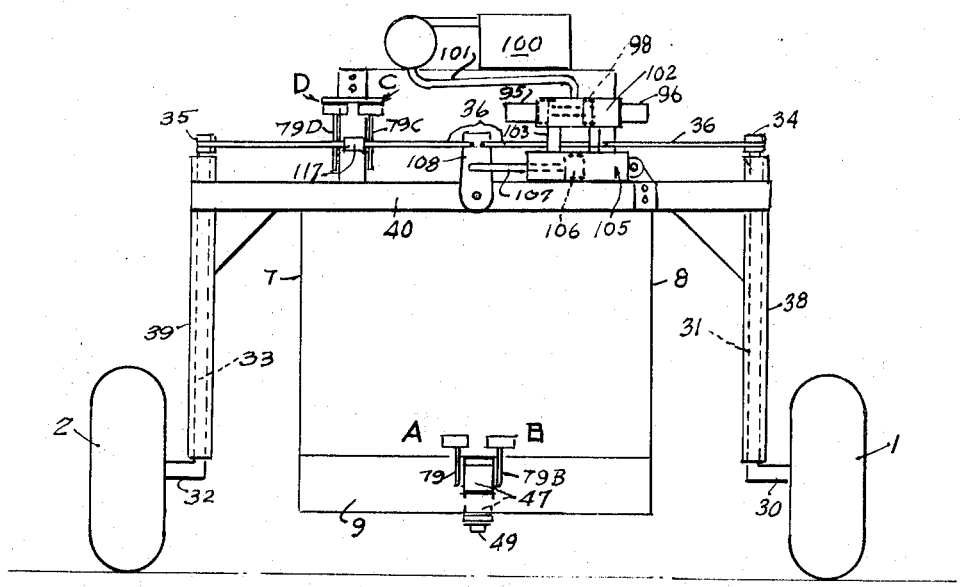
FIG. 3 is a fragmentary front elevational view of FIG. 1.

With continuing reference to the drawings wherein like reference numerals indicate like parts and particularly FIGS. 1, 2 and 3 thereof, numerals 1 and 2 indicate the steerable front wheels of the agricultural machine and 3 and 4 the rear traction wheels all mounted in the usual manner to the chassis or frame members, 5 and 6 of the machine.

As shown in FIGS. 1 and 3, a bean collector, sometimes referred to in the industry as a "scow," and comprising side walls 7 and 8 and a bottom wall 9, is secured by its side walls in any suitable manner to the machine's chassis.

A switch actuating unit comprising a frame having right and left bumper arms 12 and 13 is hingedly attached as at 14 and 15 respectively to the bottom of the scow. The bumper arms 12–13 are adjustably interconnected by a cross arm 17. The forward end of the bumper arms extend outwardly from their hinge points 14–15 into parallel rearward extension, as shown, and then bent inwardly as at 20–21 at substantially right angles at their rearward end to extend through openings 20A–21A in their respective walls 7 and 8 of the scow.

From the foregoing and with particular reference to FIG. 2 it will be apparent that the bumper arms 12–13, although normally parallel to and spaced equidistantly inward from the row crops as shown, are free to be pressed to the right or to the left into sliding contact against the stalks 23 and 24 of the row crops by any diversionary travel of the steering wheels 1 and 2 to the right or left of their normal straight line travel.

The dominant features of the present invention, as previously pointed out, reside in the steering mechanism including the solenoid actuated controls and related parts including the switches in their electric circuitry, but not the usual or well known structural or autmative elements of a harvesting tractor or other agricultural machine, such as rotatable picking reels, brush reels and conveyors which are only incidental and well known in the art.

With particular reference to FIG. 3 the stub axle 30 of the front wheel 1 is secured to a vertical shaft 31 and the stub shaft 32 of the other front wheel 2 is similarly secured to its respective vertical shaft 33. The top end of both shafts 31 and 33 are provided with arms 34 and 35 which are connected by a tierod 36. The vertical shafts 31 and 33 are rotatably mounted in vertical tubular members 38 and 39 which are interconnected at their top end by a lateral tubular member 40, all in the conventional manner.

Figure 4:
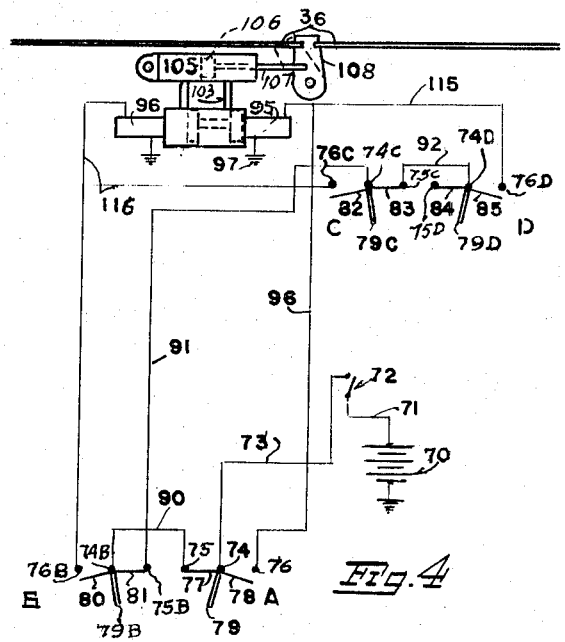
FIG. 4 is a wiring diagram.

For convenience in describing the steering control system for the front wheels 1 and 2 the switches indicated at A and B in FIG. 4 will be required and referred to as the corrective steering control switches and those indicated at C and D as the wheel alignment switches.

Preliminary to describing in detail the switches, the steering components and their related parts, the switches A and B will function to energize through the alignment switches C and D either of two right and left solenoids connected to the tierod 36 between the two front wheels 1 and 2 for normally maintaining the same in a straight course of travel parallel to the row crops being dealt with.

The bumper arms 12 and 13 are interconnected by two transversely aligned cross arms 42 and 43 (previously indicated at 17) whose inner ends are adjustably secured as at 44 and 45 respectively to a bridge plate 46 to which the rearward end of a switch actuating arm 47 is pivotally attached as at 48. Arm 47 is pivotally attached as at 49 to the bottom wall 9 of the scow midway between the side walls 7 and 8 thereof. The forward end of rod 47 is operable between switch actuating members 79 and 79B (FIG. 3) of the corrective steering control switches A and B. By this arrangement the spacing between the trailing portions of the arms 12 and 13 may be varied through the medium of the plate 46 and the fastening elements 44-45.

With particular reference to the electric circuitry shown in FIG. 4, reference numeral 70 indicates a source of electric energy such for example as a storage battery carried by the machine. One side of the battery is grounded, as shown, and its other side is connected by conductor 71 to one side of a main switch 72. The other side of switch 72 is connected by wire 73 to a central contact 74 of the switch A. Switch A also includes a normally closed contact 75 and a normally open contact 76. For convenience in further describing the electrical circuitry of this system, the switches A, B, C and D are identical and therefore a description of one will suffice for all. The switches B, C and D are each provided, respectively, with a central contact 74B, 74C and 74D, also with normally closed contacts 75B, 75C, 75D and normally open contacts 76B, 76C and 76D. Switch A is provided with integrated switch blades 77-78. Secured to the underside of the switch blades 77-78 and depending therefrom in the path of movement of the switch actuating arm 47 is a switch actuator in the form of depending stem 79. In a similar manner switch B is provided with a stem 79B and switch blades 80-81, switch C with a stem 79C and switch blades 82-83, switch D with a stem 79D and switch blades 84-85.

From the foregoing it will be readily apparent that with the master switch 72 closed and with all switch blades 77, 81, 83 and 84 in their closed position as shown in full lines, current will flow from the battery through wire 73, contact 74, switch blade 77, normally closed contact 75, wire 90, central contact 74B of switch B, switch blade 81, normally closed contact 75B, wire 91 to the central contact 74C, closed switch blade 83, contact 75C, wire 92 to central contact 74D of switch D. The circuitry just described is normal because of the neutral position of the switch actuating arm 47 and the fact that the front wheels 1 and 2 of the machine are in alignment with the rear traction wheels and the machine is traveling in a straight and centered course between and parallel to the rows of plants being dealt with.

As previously pointed out the switches A, B, C and D are of the Micro type but not restrictively so because, and as illustrated in FIG. 4, they may be of any type wherein the throw of the switch blades is minimal. The somewhat exploded diagram in FIG. 4 is merely for clearness of illustration and not intended as a limitation of any particular kind of switch.

It will be apparent that any diversion of the front steering wheels 1 and 2 from their straight path of travel, for example to the right (FIG. 2), as indicated by broken lines in FIG. 2, will cause the tractor chassis to move to the right as also shown in broken lines. Such movement will put the bumper arm 12 in pressured sliding contact with the stalks S of the plants P in the proximal row and will cause the switch actuating arm 47 to pivot about its pivotal connection 49 which will swing the forward end of the arm to the right as also shown in broken lines. Such movement of the forward end of the switch actuating arm 47 will open the normally closed switch 75 of switch A (FIG. 4) and close the normally open switch 76 thereof which will of course cause energization of solenoid 95 by current flow through wire 96 to one side of solenoid 95 whose opposite side is grounded as at 97. Energization of solenoid 95 will pull a spool valve 98 to the right as viewed in FIG. 4 (to the left as viewed in FIG. 3) which will allow fluid under pressure to flow from a fluid reservoir 100 (FIG. 3) through conduit 101 to the inside of a cylinder 102 and outwardly therefrom through one conduit 103 to the interior of a steering cylinder 105 forcing a piston 106 therein to the right in FIG. 3 and to the left in FIG. 4, which piston by its connecting rod attachment 107 to a rocker plate 108 will rock the plate into its broken line position (FIG. 4) which will cause the tierod sections 36 to move to the left and such movement through the medium of the steering arms 34-35 will pivotally restore the front steering wheels 1 and 2 into a position of alignment with the rear wheels 3 and 4 of the machine.

In the absence of an auxiliary switching mechanism for steering the front wheels independently of the mechanism and circuitry just described the front wheels would pivot intermittently from right to left continuously. To prevent this undesirable and crop damaging eventuality I also connect one side of solenoid 95 by wire 115 to the normally open side 76D of switch D and one side of solenoid 96 by wire 116 to the normally open side 76C of switch C.

Switches C and D, above referred to as wheel alignment control switches, are operable independently of steering control switches A and B by an abutment 117 secured to one tierod section, with the stems 79C and 79D of switches C and D arranged in close proximity to both sides of the abutment 117 so that either stem and hence its respective switch will be actuated by slight movement of the tierod in either direction. Assuming that movement of the abutment and stem 79D of switch D is to the right (FIG. 4) such movement will close a normally open switch 76D to cause current flow from the battery 70, switch 72, wire 73, switch blade 77 of switch A, wire 90, contact 74B and switch blade 81 of switch B through wire 91 to normally closed contact 75C of switch C, through wire 92 and now closed switch 76D through wire 115 to the solenoid 95 and from the grounded side 97 thereof back to the battery 70.

From the foregoing it will be apparent that immediately upon restoration of the front wheels 1 and 2 to a straight course of travel, parallel to the row crops, by movement of the tierod 36 in the proper direction the switches A and B will be relieved of their control because of the circuit having been broken through the contact 75 by movement to the right of switch stem 79 by the bumper arm 12 and switch actuating arm 47.

What I claim is:

1. In an agricultural harvesting machine having a chassis supported upon steerable ground engaging front wheels and ground engaging rear traction wheels, the improvement comprising:

an underslung scow carried by the machine and extending lengthwise thereof, a frame pivotally attached to said scow and extending outwardly and rearwardly relative thereto for engagement with proximal row crops, a switch actuating arm pivotally attached at one of its ends to said frame and pivotally attached intermediate its ends to said scow, the forward end of said switch actuating arm movable between a first pair of spaced apart steering control switches and adapted to alternately actuate said switches upon right or left deviation in the course of travel of said machine along the row crops, said chassis including a steering yoke supporting said steerable front wheels, a tierod carried by said yoke and connected to said steering wheels for steering the same, a steering cylinder carried by said yoke and having a piston operable therein and connected to said tierod whereby movement of the piston to the right or left within said cylinder will impart corresponding steering angles to said steering wheels, a fluid pressure cylinder carried by said machine, a valve operable within said fluid pressure cylinder, one side of said fluid pressure cylinder in communication at both of its ends with the corresponding ends of said steering cylinder, the other side of said fluid pressure cylinder connected to a fluid pump and a fluid reservoir, said valve connected at each of its ends to a solenoid mounted upon each end of said fluid pressure cylinder, a second pair of electric switches each in circuit with a solenoid and each operable by movement of said tierod to maintain said steering wheels in alignment with the tractor centerline after return of the chassis to a desired path between the row crops causing deactivation of said steering control switches, all of said switches in electric circuitry with each other and with a source of electric current carried by said machine, each of said switches being of the single pole double throw type, each of said solenoids having a core connected to said valve, one end of each of said solenoids having a ground connection to said source of electric current, the opposite end of one solenoid electrically connected to one side of one switch in said first pair of switches and to the corresponding side of the other switch in said second pair of switches, and the opposite end of the other side of said solenoids electrically connected to one side of the other switch in said first pair of switches and to the corresponding side of the other switch in said second pair of switches.

2. In an agricultural machine as claimed in claim 1, wherein said switch actuating arm extends between said steering control switches to prevent their actuation by ground obstructions.

3. An agricultural machine as claimed in claim 1 wherein said steering control switches are in series with one another and with said wheel alignment switches also wired in series whereby said wheel alignment switches are actuated only upon closing of both of said steering control switches as occurs when the machine chassis is centered between rows and said frame is free of row crop contact.

* * * * *